March 27, 1962 D. P. HUNTINGTON ETAL 3,027,274
COMPOSITIONS FOR TREATING FIBROUS MATERIALS
Filed Oct. 1, 1959
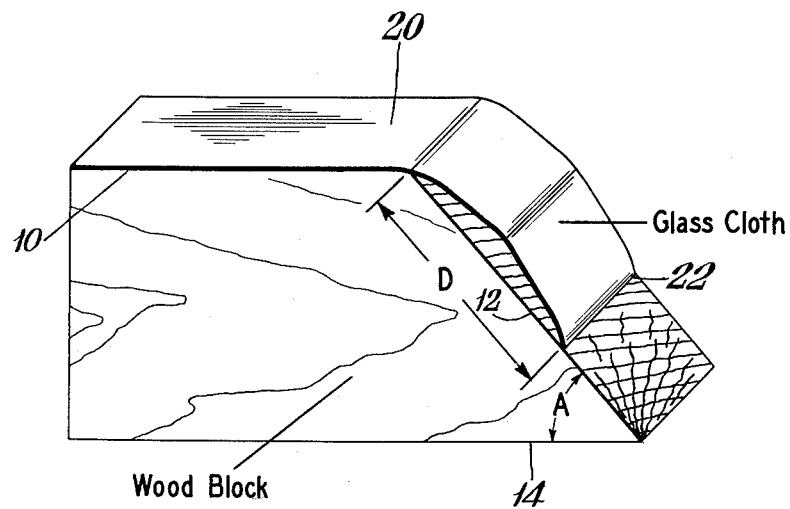
INVENTORS
PAUL A. HOMIER
DEXTER P. HUNTINGTON
BY Elmer J. Fischer
ATTORNEY

United States Patent Office 3,027,274
Patented Mar. 27, 1962

3,027,274
COMPOSITIONS FOR TREATING FIBROUS MATERIALS
Dexter P. Huntington, Tonawanda, N.Y., and Paul A. Homier, La Grange, Ga., assignors to Union Carbide Corporation, a corporation of New York
Filed Oct. 1, 1959, Ser. No. 843,804
16 Claims. (Cl. 117—126)

This invention relates to a new composition for sizing or finishing fibrous glass materials to be bonded by thermosetting resins in the preparation of reinforced plastics. More particularly, the invention relates to a composition and process for providing finished glass fibrous material useful in combination with thermosetting resins for making reinforced plastics, which finished glass fibrous material has a "soft hand" or drape, i.e., reduced stiffness and gives improved properties to composite articles made therefrom.

Fibrous glass materials in various forms, such as, for example, fibers, mats, and cloth, have been widely employed as reinforcing means for numerous plastics. Glass reinforced plastics, such as glass cloth-resin laminates or glass fiber-filled resinous sheets have found wide use in building construction, home furnishings, sporting equipment, and in the aircraft industries. They are noted for their high strength to weight ratio.

The thermosetting resins or plastics which are most often employed in the preparation of fibrous glass laminates include the aldehyde condensation resins, the linear polyester laminating resins and the epoxy resins. Examples of the aldehyde condensation resins include the phenol-formaldehyde resins, the melamine-formaldehyde resins, and the urea-formaldehyde resins. The linear polyester laminating resins are usually composed of the reaction product of maleic anhydride, phthalic anhydride and diethylene glycol which has been diluted with from 10 to 40% by weight of styrene, as well as the corresponding alcohol-, acid-, and oil-modified products. Epoxy-type resins include those which comprise the glycidyl ethers of polyhydric phenols, such as the diglycidyl ethers of diphenylol methanes and the diglycidyl ethers of diphenylol propanes, as well as blends of such diglycidyl ethers of polyhydric phenols with such modifying ingredients as the polyphenol compounds. Such epoxy resins can be prepared by the reaction of epichlorohydrin with a polyhydric phenol in the presence of a base such as an alkali or alkaline earth metal hydroxide. In the preparation of the epoxy resins, various dihydric phenols may be employed to react with epichlorohydrin and they include 2,2-bis(2-hydroxyphenyl)propane, bis-(4-hydroxyphenyl)methane, 1,1 - bis(4 - hydroxyphenyl)-ethane, 1,1-bis(4-hydroxyphenyl)isobutane, 2-2-bis(4-hydroxyphenyl)butane, 2,2-bis(4-hydroxy-2-methylphenyl)-propane, 2,2-bis(4-hydroxy - 2 - tertiarybutylphenyl)pro-pane, 2,2-bis(2-hydroxynaphthyl)pentane and the like.

In the preparation of composite articles, where thermosetting resinous materials are combined with fibrous glass materials, it is necessary to achieve a high degree of lasting bonding between the glass fiber surface and the resin if a satisfactory product is to be obtained. However, because of the basic differences between glass and organic resinous materials, the bond that is formed therebetween in the preparation of composite articles is weaker than the materials themselves. Failure to achieve a strong bond materially detracts from the properties of and, consequently, limits the application of the product. For example, the mechanical strength, the moisture resistance, the resistance to degradation at high temperatures and the useful life of fibrous glass reinforced plastics all suffer from weakness of the bond between the resins and glass material.

In order to improve the bond between fibrous glass reinforcing material and thermosetting resins, the fibrous glass is commonly coated with an agent that will cause the resin to adhere more tenaciously to the glass. Silicon compounds having vinyl groups attached to the silicon atom are today well-known for their bonding properties on glass. This type of compound, which provides excellent bonding between fibrous glass and polyester resins, has also been used with epoxy resins and provides a relatively good hand or drape thereto.

Recently, however, it has been shown that the aldehyde condensation resins and the epoxy resins, can be more securely bonded to fibrous glass materials if the latter were first sized or finished with aminoalkylsilicon compounds, such as gamma-aminopropyltriethoxysilane. Laminates so prepared have been found to have greatly improved flexural strength, particularly at high temperatures, either in the wet or dry state, and provide a product that is superior in physical properties over laminates prepared from the same resins and heat cleaned glass or glass coated with other previously known bonding agents, such as the vinyl silanes.

A disadvantage which has been found in the use of fibrous glass cloth finished with said aminoalkylsilicon compounds has been that the aminoalkylsilicon compounds imparts a certain degree of harshness or stiffness to the finished glass cloth said harshness or stiffness not being found on heat cleaned glass cloth, and found only to a minor degree on glass cloth finished with vinyl silicon compounds. The harshness or stiffness renders the finished glass cloth less suitable for making contoured laminates, that is, laminators have found it difficult to drape the finished glass cloth over complex mold contours, particularly when using wet lay-up techniques, for the cloth. The cloth because of its stiffness, does not conform to the curvature of the mold.

Accordingly, it is an object of this invention to provide an improved bonding agent for fibrous glass to be used with aldehyde condensation resins and epoxy resins in making of laminates. More particularly, it is an object of the present invention to provide sized or finished fibrous glass having improved softness in "hand" or drape but which may be bonded to the aforesaid types of resins without sacrificing any structural properties that can be otherwise obtained through the use of fibrous glass sized or finished with gamma-aminopropyltriethoxysilane.

We have found that fibrous glass cloth treated with a mixture comprising gamma-aminopropyltriethoxysilane and glycerol has better softness and improved drape properties than glass cloth treated with gamma-aminopropyltriethoxysilane alone. We have also found that not only is fibrous glass cloth finished with gamma-aminopropyltriethoxysilane-glycerol composition particularly suitable for making complex contoured laminates bonded with aldehyde condensation resins or epoxy resins, but also that the resultant formed laminates, including those made in more simple configurations, possess improved physical properties over corresponding resin laminates prepared from fibrous glass cloth finished with gamma-aminopropyltriethoxysilane alone. It has been found that the flexural strength in the improved laminates have shown improvements up to 51 percent.

In the single figure of the accompanying drawing there is a perspective view of a testing device for comparing relative stiffness of various fibrous cloth materials. The testing device is similar to that described in ASTM D-1388 and comprises essentially a wood block of one inch thickness having a flat horizontal upper surface 10 and an inclined flat surface 12, which is inclined at a 45° angle (angle A) to a base 14. As shown, surfaces 10 and 14 are parallel to each other. The test is conducted by placing a strip of cloth 20, ten inches by one inch along the length of the flat upper surface 10. Upper surface 10 is at least ten inches in length. The strip of cloth 20 is held in place by gravity and the hand of the test operator. The cloth is then moved slowly along upper surface 10 in the direction of inclined surface 12 until the unsupported leading edge 22 of the cloth sags and touches the inclined surface 12. The distance D from the intersection of inclined surface 12 and upper surface 10 to the point along the inclined surface 12 where the leading edge 22 of the cloth touches the inclined side 12 is a measurement of the stiffness of the cloth and is hereinafter referred to in inches as the drape number. The shorter the distance D the more supple the cloth and the longer the distance D the stiffer the cloth.

The composition of this invention which is useful to provide both a bonding surface and a soft hand to fibrous glass cloth is prepared by admixing glycerol with gamma-aminopropyltriethoxysilane. The particular method of mixing is not narrowly critical and the mixtures can be prepared by either adding glycerol to gamma-aminopropylthiethoxysilane using mild agitation or, alternatively, the gamma-aminopropyltriethoxysilane can be added to the glycerol. The composition can also be prepared by adding glycerol to a dilute solution of the gamma-aminopropyltriethoxysilane in a suitable solvent. The addition and agitation is conducted at room temperature; however, the temperature of the mixture increases due to an exothermic reaction. For example, in an experiment wherein the total weight of the mixture was six pounds, the temperature increased from 25° C. to about 60° C. Without wishing to be bound by any one particular theory as to the chemical characterization of the resulting product formed upon the admixture of these materials, it is believed that the product is a complex mixture of the gamma-aminopropylthiethoxysilane-glycerol silane esters, ethanol, and possibly some hydrolyzates of the silane monomers. One reaction that probably takes place may be schematically illustrated by the following equation.

Any ethanol that may be formed is not removed from the system, and a condition of equilibrium is probably reached at which the final composition contains a complex mixture of both the starting materials and the transesterification products.

In the practice of our invention, it is desirable to effect treatment of the fibrous glass materials by immersing them in a solution of the gamma-aminopropyltriethoxysilane-glycerol combination. From an economic and practical standpoint, an aqueous solution is preferred because these materials are characterized by their ability to form stable aqueous solutions. This avoids the necessity of employing pure organic substances as solvents. Such latter solvents are oftentimes inflammable and/or volatile. When in aqueous solution, the ethoxy groups of the gamma-aminopropyltriethoxysilane will hydrolyze at a slow rate and should such solutions be allowed to stand for sufficiently long periods such ethoxy groups will hydrolyze and condense to form water-soluble gamma-aminopropylpolysiloxanes. Organic solvents may also be employed either by themselves or in admixtures with water. Such solvents include the alkanols and the ether alkanols, such as ethanol, propanol, methoxyethanol, ethoxyethanol and the like, and the aromatic hydrocarbons such as benzene, toluene, xylene and the like.

The fibrous glass material is saturated with the treating solution, as by immersion in a bath, in order that the coating composition will be picked up by the fiber. After removal of the fibrous glass material from the bath, the excess solvent is removed by known expedients such as by air drying. Thereafter composite articles, such as laminates or any other reinforced plastic products, can then be prepared from the sized cloth using known procedures and standard techniques. If desired, the treated glass cloth after removal of the solvent, as by air drying, can be heated to cure the finish.

The ratio of the amount by weight of glycerol to gamma-aminopropyltriethoxysilane can be from 10 parts glycerol to 1 part gamma-aminopropylthiethoxysilane to 1 part glycerol to 1 part gamma-aminopropylthiethoxysilane. It is preferred that the ratio be 1 to 1 in order to obtain minimum drape numbers and to obtain the best physical properties in the laminates prepared from glass cloth sized with the above admixture.

The amount of the admixture of glycerine and gamma-aminopropyltriethoxysilane present in the solution is not narrowly critical and can range from 0.2 part to 5 parts by weight of the admixture to 100 parts by weight of the solvent.

The concentration of the admixture in the solution is adjusted so that the dried, treated glass cloth contains from 0.4 to 1.5 parts gamma-aminopropyltriethoxysilane and from 0.4 to 15 parts glycerine to 100 parts by weight of the treated cloth when dried. As hereinbefore stated, it is preferred to employ equal parts by weight of gamma-aminopropyltriethoxysilane and glycerol.

It is especially preferred to adjust the concentration of the admixture in the solution so that the dried, treated glass cloth contains from 0.1 to 0.8 part by weight gamma-aminopropyltriethoxysilane and from 0.6 to 0.8 part by weight glycerol to 100 parts by weight of the treated dry cloth.

The term "181 glass cloth" as used herein refers to a satin weave glass cloth having a thickness of 10 mils, weighting about 8.9 ounces per square yard, having 57 by 54 ends and picks per sq. inch and a breaking strength of 375 x 350 pounds per square inch.

The following examples serve to further illustrate the invention and are not to be construed as limitations thereon.

EXAMPLE 1

A mixture of gamma-aminopropyltriethoxysilane and glycerol was prepared by adding an equal part by weight of glycerol to gamma-aminopropyltriethoxysilane. The glycerol-gamma-aminopropyltriethoxysilane mixture was then diluted with water so that the final solution contained 1 part by weight of gamma-aminopropyltriethoxysilane per 100 parts by weight of the final solution.

Several additional solutions were prepared in the above manner except that the ratio of the weight of glycerol to gamma-aminopropyl was varied from about 10 to 1 to about ½ to 1.

EXAMPLE 2

To an aqueous solution of gamma-aminopropyltriethoxysilane containing 1% by weight of gamma-aminopropyltriethoxysilane, was added various amounts of glycerol so as to prepare final solutions wherein the concentration of gamma-aminopropyltriethoxysilane was 1 part by weight to 100 parts by weight of the total solution and the ratio of the weight of glycerol to the weight of gamma-aminopropyltriethoxysilane varied from about 10 to 1 to about 0.5 to 1.

EXAMPLE 3

The solutions prepared in Examples 1 and 2 were employed in finishing heat-cleaned 181 glass cloth according to the following procedure:

The glass cloth was immersed in the solution of glycerol-gamma-aminopropyltriethoxysilane. After removal from the solution, the glass cloth was passed through squeeze rolls to remove excess solution and air dried at room temperature to remove the solvent therefrom. The dried glass cloth contained approximately 0.6 part by weight gamma-aminopropyltriethoxysilane per 100 parts by weight of the dried treated glass cloth. The glass cloth thus treated was tested for drape number according to the previously described test with the following results:

8 min. The temperature of the press platens was maintained at 150° C.

(2) The pressure was then increased to 200 p.s.i. for 22 min. and the temperature maintained at 150° C.

(3) The press was then cooled to about 60° C. and then the laminate was removed.

(4) The laminate was then post-cured in an oven as follows:

24 hr. at 121° C.
24 hr. at 149° C.
24 hr. at 177° C.

In Table II are shown the improved flexural strengths of the laminate thus prepared in comparison to laminates made similarly from glass cloth finished with gamma-aminopropyltriethoxysilane. The flexural strengths were determined according to the test procedure described in Federal Specification L–P–406b.

*Table II*

|  | Bonding Resin | Finish | Dry | After 2-hours in Boiling Water | At 500° F. After 100 Hours at 500° F.[2] |
|---|---|---|---|---|---|
| Example 4 | Commercial heat-hardenable phenol-formaldehyde varnish-A [1]. | glycerol-γ-a-mino-propyltri-ethoxysilane. | 76,000 | 78,000 | 58,500 |
| Control | Commercial heat-hardenable phenol-formaldehyde varnish-A [1]. | γ-amino-propyltri-ethoxysilane. | 72,000 | 70,000 | 49,000 |
| | Percent Improvement | | 6% | 11% | 19% |
| Example 4 | Commercial heat-hardenable phenol-formaldehyde varnish-B [1]. | glycerol-γ-amino-propyltriethoxysilane. | 97,000 | 89,000 | |
| Control | Commercial heat-hardenable phenol-formaldehyde varnish-B [1]. | γ-amino-propyltri-ethoxysilane. | 89,000 | 79,000 | |
| | Percent Improvement | | 16% | 8% | |

[1] A base catalyzed phenol-formaldehyde liquid resol, visc. 150 cp.; Sp. G. 1.15.
[2] Test was conducted at 500° F.

*Table I*

| Parts by weight glycerol to parts by weight of gamma-aminopropyltriethoxysilane | Drape No. Solution prepared by procedures of— | |
|---|---|---|
| | Example 1 | Example 2 |
| 10 to 1 | 2½ | 2⅜ |
| 2½ to 1 | 2½ | 2½ |
| 1 to 1 | 2⅝ | 2½ |
| ½ to 1 | 3¼ | 3 |
| 0 to 1 | 6⅜ | |

EXAMPLE 4

Glass cloth which had been finished according to the procedure of Example 3 with an aqueous solution prepared according to the procedure of Example 1 wherein the ratio of the weight of glycerol and gamma-aminopropyltriethoxysilane was 1 to 1 and was used to prepare a laminate with phenol-aldehyde condensation resins by the following procedure:

The finished glass cloth was dipped into a solvent solution of a heat-hardenable phenol-aldehyde resin. The amount of resin in excess of 35–40 weight percent based on the weight of the glass cloth was removed from the cloth by means of squeeze rolls. The resin-impregnated cloth was then placed in an air circulating oven for 3–5 min. at 135° C. to produce a partially cured or "B" stage resin. Thirteen plies of the "B" stage resin-coated cloth were then placed in laminating press and the conditions used to form the laminate were as follows:

(1) Just sufficient pressure, 1–2 lb. per sq. in., was applied to bring the plies in contact with each other for

EXAMPLE 5

A laminate was made from a commercial epoxy resin and 13 plies of glycerol-γ-aminopropyltriethoxysilane finished glass cloth. The glass cloth was finished as described in Example 3 by impregnation with an aqueous solution containing 1 part by weight of glycerol, 1 part by weight of gamma-aminopropyltriethoxysilane, and 98 parts by weight water. The epoxy resin was poured onto each of the 13 plies of finished cloth as the cloth plies were being stacked. The stacked resin treated cloth was then sealed in a flexible bag and the air removed from the bag by means of a hand roller. After the air was removed, the resin-cloth assembly was placed in a laminating press and cured using the following temperatures and pressures:

(1) Just sufficient pressure, 1–2 lb. per sq. in., was applied to bring the plies in contact with each other for 8 minutes. The temperature of the press platens was maintained at 121° C.

(2) The pressure was then increased to 200 p.s.i. for 22 minutes. The temperature of the press platens was maintained at 121° C.

(3) The press was then cooled to below 60° C. and the laminate removed.

(4) The laminate was then post-cured in an oven for one hour at 202° C.

Flexural strengths of the laminate were obtained using the test procedure described in Federal Specification L–P–406b. The test data is set forth in Table III including a control laminate made under the same conditions from glass cloth finished with gamma-aminopropyltriethoxysilane.

Table III

| | Bonding Commercial Epoxy Resin | Finish | Flexural Strength (p.s.i.) | |
|---|---|---|---|---|
| | | | At 75 °F. | At 200 °F. |
| Example 5 | Diglycidyl ether of 2,2-bis(4-hydroxyphenyl)-propane.[1] | gylcerol-γ-aminopropyltriethoxysilane. | 85,900 | 68,200 |
| Control | ---do [1] | γ-aminopropyltriethoxysilane. | 74,000 | 56,000 |
| | Percent Improvement | | 15% | 22% |

[1] Containing 26 parts by weight methylene dianiline per 100 parts of diglycidyl.

EXAMPLE 6

A laminate was made using an epoxy resin and a dry lay-up procedure which is essentially the same procedure as described in Example 4, except for the following modifications.

(a) The temperature of the press platens was maintained at 160° C.

(b) The final laminating pressure was 1000 p.s.i.

(c) The laminate was post-cured at 160° C. in an oven for 8 hours.

The following table gives the properties of the laminate in comparison with a control laminate made under the same conditions from glass cloth finished with gamma-aminopropyltriethoxysilane alone.

Table IV

| | Bonding Epoxy | Finish | Flexural Strength (p.s.i.) | |
|---|---|---|---|---|
| | | | Dry | After 2 hours in Boiling Water |
| Example 6 | Commercial epoxy resin containing approximately 5 moles of the diglycidyl ether of bis(4-hydroxy-phenyl)methane and 4 moles of bis (4-hydroxyphenyl)-methane containing 0.5 part alpha methyl benzyl dimethyl amine to 100 parts resin. | glycerol-γ-aminopropyltriethoxysilane. | 88,000 | 81,000 |
| Control | ---do--- | γ-aminopropyltriethoxysilane. | 81,000 | 74,000 |
| | Percent Improvement | | 9% | 10% |

EXAMPLE 7

A laminate was made using a melamine formaldehyde condensation resin (Melmac 405 manufactured by American Cyanamide Co.) in the same manner as described in Example 4, except contact pressure was applied only a few minutes and the final laminating pressure was 1000 p.s.i., instead of 200 p.s.i. In addition, the laminate was not post-cured.

The following dry and wet flexural strengths of the laminate was obtained using the test procedure described in Federal Specification L–P–406b on the laminate of Example 7 and a similar laminate prepared from glass cloth finished with gamma-aminopropyltriethoxysilane.

Table V

| | Finish | Flexural Strength (p.s.i.) | |
|---|---|---|---|
| | | Dry | 2-hour boil |
| Example 7 | glycerol-γ-aminopropyltriethoxysilane. | 90,000 | 90,000 |
| Control | γ-aminopropyltriethoxysilane. | 80,000 | 74,000 |
| | Percent improvement | 13% | 22% |

What is claimed is:

1. A composition for coating glass fibers which comprises an admixture of gamma-aminopropyltriethoxysilane and glycerol.

2. A composition for coating glass fibers which comprises an admixture of 1 part by weight of gamma-aminopropyltriethoxysilane and from 1 to 10 parts by weight glycerol.

3. A composition for coating glass fibers which comprises an admixture of 1 part by weight gamma-aminopropyltriethoxysilane and 1 part by weight glycerol.

4. In a process for coating a fibrous glass material with gassa-aminopropyltriethoxysilane the improvement which comprises adding glycerol to the gamma-aminopropyltriethoxysilane prior to coating the fibrous glass material.

5. A process as claimed in claim 4 wherein the amount of glycerol added is from 1 to 10 parts by weight per part by weight of gamma-aminopropyltriethoxysilane.

6. A process as claimed in claim 4 wherein the amount of glycerol added is 1 part by weight per part by weight of gamma-aminopropyltriethoxysilane.

7. In a process for producing composite articles from glass fibers the improvement, which comprises applying to said fibers an admixture of glycerol and gamma-aminopropyltriethoxysilane prior to producing the composite article.

8. In a process for producing a laminated product from glass fibers and a bonding organic resin selected from the group consisting of phenol-aldehyde condensation resins, epoxy resins and melamine-aldehyde condensation resins, the improvement which comprises initially applying to said fibers an admixture of glycerol and gamma-aminopropyltriethoxysilane prior to the preparation of the laminated product.

9. In a process for producing a laminated product from glass fibers and a phenol-aldehyde condensation resin, the improvement which comprises initially applying to said fibers an admixture of glycerol and gamma-aminopropyltriethoxysilane dissolved in a solvent and then volatilizing the solvent prior to producing the laminated product.

10. In a process for producing a laminated product from glass fibers and an epoxy resin, the improvement which comprises initially applying to said fibers an admixture of glycerol and gamma-aminopropyltriethoxysilane dissolved in a solvent and then volatilizing the solvent prior to producing the laminated product.

11. In a process for producing a laminated product from glass fibers and a melamine-aldehyde condensation resin, the improvement which comprises applying to said fibers an admixture of glycerol and gamma-aminopropyltriethoxysilane dissolved in a solvent and then volatilizing the solvent prior to producing the laminated product.

12. A glass fibrous material coated with an admixture of glycerol and gamma-aminopropyltriethoxysilane.

13. A composite article comprising glass cloth finished with an admixture of gamma-aminopropyltriethoxysilane and glycerol and an organic thermosetting resin selected from the group consisting of phenol-aldehyde condensation resins, epoxy resins and melamine-aldehyde condensation resins.

14. A composite article comprising glass cloth finished with an admixture of gamma-aminopropyltriethoxysilane and glycerol and bonded with a heat-hardened phenol-aldehyde condensation resin.

15. A composite article comprising glass cloth finished with an admixture of gamma-aminopropyltriethoxysilane and glycerol and bonded with an epoxy resin.

16. A composite article comprising glass cloth finished with an admixture of gamma-aminopropyltriethoxysilane and glycerol and bonded with a melamine-aldehyde condensation resin.

References Cited in the file of this patent

UNITED STATES PATENTS

| | | |
|---|---|---|
| 77,138 | Warren | Apr. 21, 1868 |
| 1,156,462 | Burton | Oct. 12, 1915 |
| 2,441,066 | Hanford | May 4, 1948 |
| 2,584,343 | Goodwin | Feb. 2, 1952 |
| 2,584,351 | Hunter et al. | Feb. 5, 1952 |
| 2,832,754 | Jex et al. | Apr. 29, 1958 |